United States Patent [19]

Schlüter et al.

[11] Patent Number: 5,487,327
[45] Date of Patent: Jan. 30, 1996

[54] BOOSTER HOUSING, ESPECIALLY FOR VEHICLE BRAKE SYSTEMS, AND METHOD OF ASSEMBLING SUCH AS BOOSTER HOUSING

[75] Inventors: Peter Schlüter, Kammerforst; Lothar Zeuner, Steineroth, both of Germany

[73] Assignee: Lucas Industries Public Limited Company, Solihull, Great Britain

[21] Appl. No.: 284,123

[22] Filed: Aug. 2, 1994

[30] Foreign Application Priority Data

Sep. 24, 1993 [DE] Germany .................... 43 32 611.0

[51] Int. Cl.⁶ .................... F01B 11/02; F16J 10/00
[52] U.S. Cl. .................... 92/128; 92/165 PR
[58] Field of Search .................... 92/169.2, 169.3, 92/169.4, 165 PR, 128; 91/369.1, 376 R, 369.2; 29/432, 510, 511, 515, 516

[56] References Cited

U.S. PATENT DOCUMENTS

| 4,256,016 | 3/1981 | Thomas | 91/376 R X |
| 4,366,612 | 1/1983 | Dorsett et al. | 29/510 X |
| 4,408,389 | 10/1983 | Henin | 29/510 X |
| 4,632,014 | 12/1986 | Endo | 91/376 R X |
| 4,944,214 | 7/1990 | Briggs | 91/376 R X |
| 5,090,298 | 2/1992 | Gautier et al. | 92/165 PR X |
| 5,410,880 | 5/1995 | Schluter | 92/169.3 X |

FOREIGN PATENT DOCUMENTS

| 0331535 | 9/1989 | European Pat. Off. | 91/369.1 |
| 3104923A1 | 2/1981 | Germany | |
| 4202820A1 | 1/1992 | Germany | |
| 5-270394 | 10/1993 | Japan | 91/376 R |

OTHER PUBLICATIONS

Handbuch Der Fertigungstechnik "Fugen, Handhaben Und Montieren", vol. 5, Prof. Dr.–Ing. Dr. h.c. Gunter Spur, Carl Hanser Verlag Munchen Wien, 1986, pp. 43–44, 64–67, 340–341.

Primary Examiner—John E. Ryznic
Attorney, Agent, or Firm—Oblon, Spivak, McClelland, Maier & Neustadt

[57] ABSTRACT

A booster housing, especially for vehicle brake systems, and a method of assembling such a booster housing in which a booster housing (20) has two housing bottoms (26, 28) which are each disposed at one side of a movable partition (60). Connecting members (32) on at least one of the housing bottoms (26) are each tightly crimped around one fastening hole (30). Spacers (50) extend between the two housing bottoms (26, 28) as well as through the partition (60). Each of the connecting members (32) is provided with a recess (40) into which an end portion (52) of the associated spacer (50) is inserted and crimped. The booster housing (20) is assembled by inserting an end portion (52) of a spacer (50) into the recess (40) of one connecting member (32), passing the connecting member (32) through a fastening hole (30), and simultaneously crimping the connecting member (32) with the housing bottom (26) and the spacer (50).

5 Claims, 3 Drawing Sheets

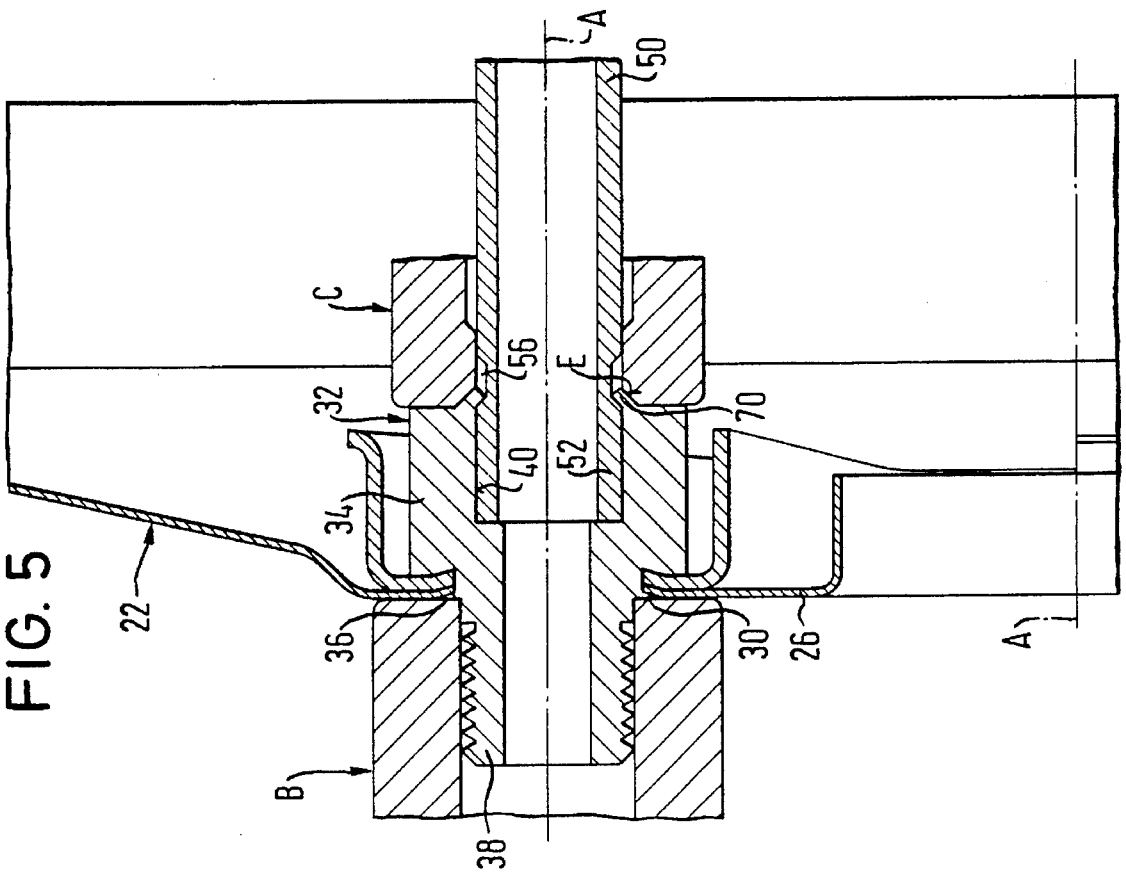
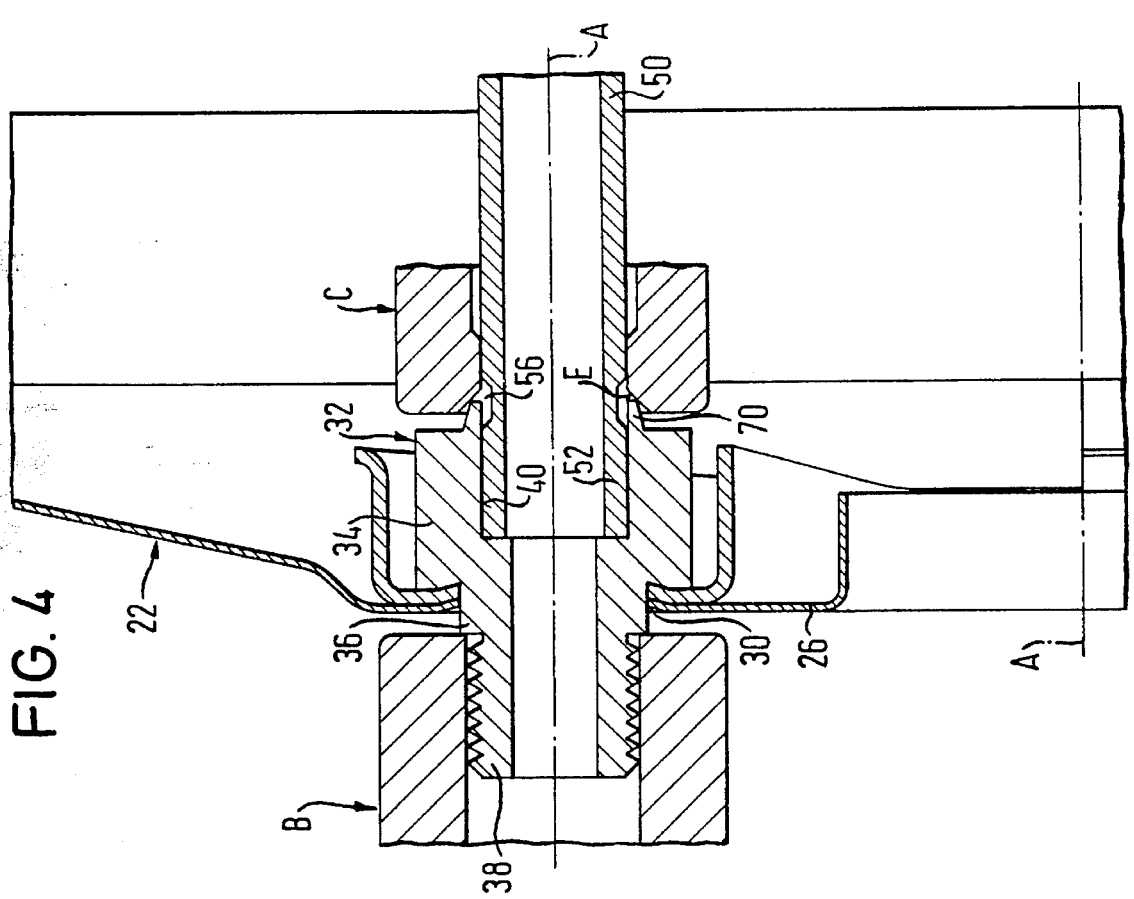

BOOSTER HOUSING, ESPECIALLY FOR VEHICLE BRAKE SYSTEMS, AND METHOD OF ASSEMBLING SUCH AS BOOSTER HOUSING

BACKGROUND OF THE INVENTION

FIELD OF THE INVENTION

The invention relates to a booster housing, especially for vehicle brake systems, comprising two housing bottoms which are disposed at either side of a movable partition and are provided with fastening holes, connecting members which are mounted on at least one of the housing bottoms and are tightly crimped with the same around each of its fastening holes, and spacers which extend between the two housing bottoms as well as through the movable partition and are fixed to the connecting members.

In a conventional booster housing (DE 42 02 820 A1), the spacers are pipes which extend parallelly to the main axis being normally arranged in the longitudinal direction of the vehicle of the associated booster housing, and through the same, from the front to the rear, and which are welded at their front ends to a sleeve-like front connecting member and are screwed with their rear ends into an annular rear connecting member. The screw connection of the rear end of each spacer with the rear connecting member allows an adjustment of the effective length of each individual spacer. For this reason, generally, the considerably complex manufacture of the required screw threads providing an air-tight pair of threads is worth-while. The required mechanically firm, and at the same time air-tight, connection of each spacer with the associated front connecting member has been realized by electric resistance welding. This consitutes a time and cost saving method as compared to the manufacture of a screw connection which in some cases, however, has to be followed by a heat treatment to prevent the danger of breaking due to brittleness. Independently, it may occur that splashes of the liquefied metal of the spacers are during welding deposited on the outer sleeve surface thereof and, in the course of time, cause damage to the sealing of the movable partition vis-à-vis the spacers.

The "Handbuch der Fertigungstechnik", vol. 5, Prof.Dr. Ing. Dr.h.C. Günter Spur, Carl Hanser Verlag München Wien, 1986, discloses various methods for pressing parts together which are only formed elastically and held together by force. Moreover, the method of solid state bonding is disclosed in this prior art.

SUMMARY OF THE INVENTION

The invention is therefore based on the problem of providing in a still more simple way in a booster housing of the type described hereinbefore a firm and air-tight connection between each spacer and at least one of the associated connecting members, which moreover does not result in an impairment of the surface quality of the spacers.

According to the apparatus of the invention, the above and other objects are achieved by a booster housing, especially for vehicle brake systems, comprising two housing bottoms which are disposed at either side of a movable partition and are provided with fastening holes. Connecting members are mounted on at least one of the housing bottoms and are tightly crimped with the respective housing bottom around the fastening holes thereof. Spacers extend between the two housing bottoms as well as through the movable partition and are fixed to the connecting members. Each of the connecting members has a recess into which an end portion of the associated spacer is inserted and the connecting member is crimped.

Advantageous modifications of the booster housing according to the invention result from claims 2 and 3.

The subject matter of the invention is also a method of assembling a booster housing of the mentioned type. The method according to the invention is carried out by the following steps:

inserting an end portion of a spacer into a recess of a connecting member, passing the connecting member through a fastening hole in a housing bottom in such a way that a collar formed on the connecting member extends through the fastening hole, and simultaneous crimping of the connecting member with the housing bottom and the spacer.

The method according to the invention does not cost more—apart from a maybe slightly higher expenditure for the apparatus for carrying out the process—than the conventional crimping of connecting members with the associated housing bottom. The crimping according to the invention of the spacer with the connecting member is made during the same time that has to be spent anyway for crimping the connecting member with the associated housing bottom. It was found that the axial pressure required for crimping a connecting member with the associated housing bottom, provided the tools employed for crimping are appropriately designed, also suffices to crimp the connecting member with the associated spacer so as to provide an air-tight and mechanically sufficiently firm connection.

A further modification of the method according to the invention is the subject matter of claim 5.

BRIEF DESCRIPTION OF THE DRAWINGS

One modification each of a booster housing according to the invention and two apparatuses for crimping are illustrated in the following in more detail, with the aid of schematic drawings. In which, FIG. 4 shows a detail according to FIG. 2 with modifications, before crimping, and FIG. 5 shows the same detail as in FIG. 4, however after crimping.

DETAILED DESCRIPTION OF THE PREFERRED EMBODIMENTS

Figure 1:
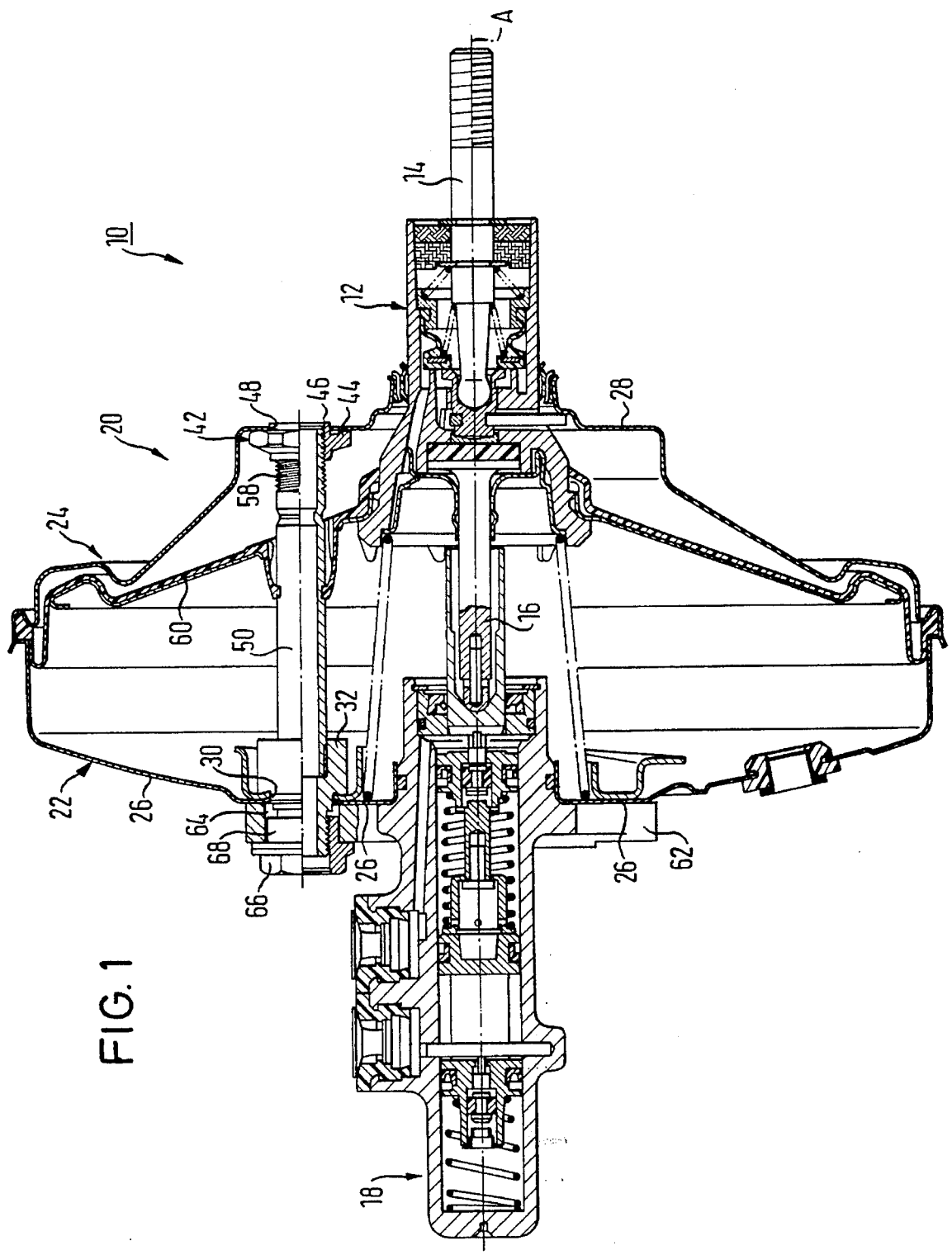
FIG. 1 shows an axial section through a booster housing.

FIG. 1 illustrates a pneumatic brake booster 10 having a control valve 12 for use with a hydraulic motor vehicle brake system. Control valve 12 may be actuated by an actuating rod 14 and brake booster 10, via a power output rod 16, in turn, actuates a hydraulic master brake cylinder 18.

Brake booster 10 has a booster housing 20 designed to be substantially symmetrically with respect to a horizontal axis A in FIG. 1—and in the normal, built-in position as well— and is composed of a front housing part 22 and a rear housing part 24. The two housing parts 22 and 24 have a front or rear housing bottom 26 or 28 extending substantially perpendicularly with respect to axis A.

Two fastening holes 30 which are diametrically opposed with respect to axis A are punched from the front housing bottom 26 and one front connecting member 32 is mounted in each hole 30. The front connecting members 32, one of which, only, is illustrated in the drawings, are manufactured as lathe-machined members, each comprising a flange 34 which, from the rear, rests against the front housing bottom 26, and a substantially cylindrical collar 36 extending through the associated fastening hole 30 and is provided in front with a pin with thread 38. The front connecting members 32 are throughout hollow, each having an enlarged cylindrical recess 40 in the respective rear region.

A pair of rear connecting members 42 is assigned to the rear housing bottom 28, which are aligned with one each of the front connecting members 32, each of which likewise having a flange 44 and a collar 46, wherein flange 44 rests from the inside against the rear housing bottom 28, and collar 46 extends to the rear through a fastening hole 48 in the rear housing bottom.

Figure 2:
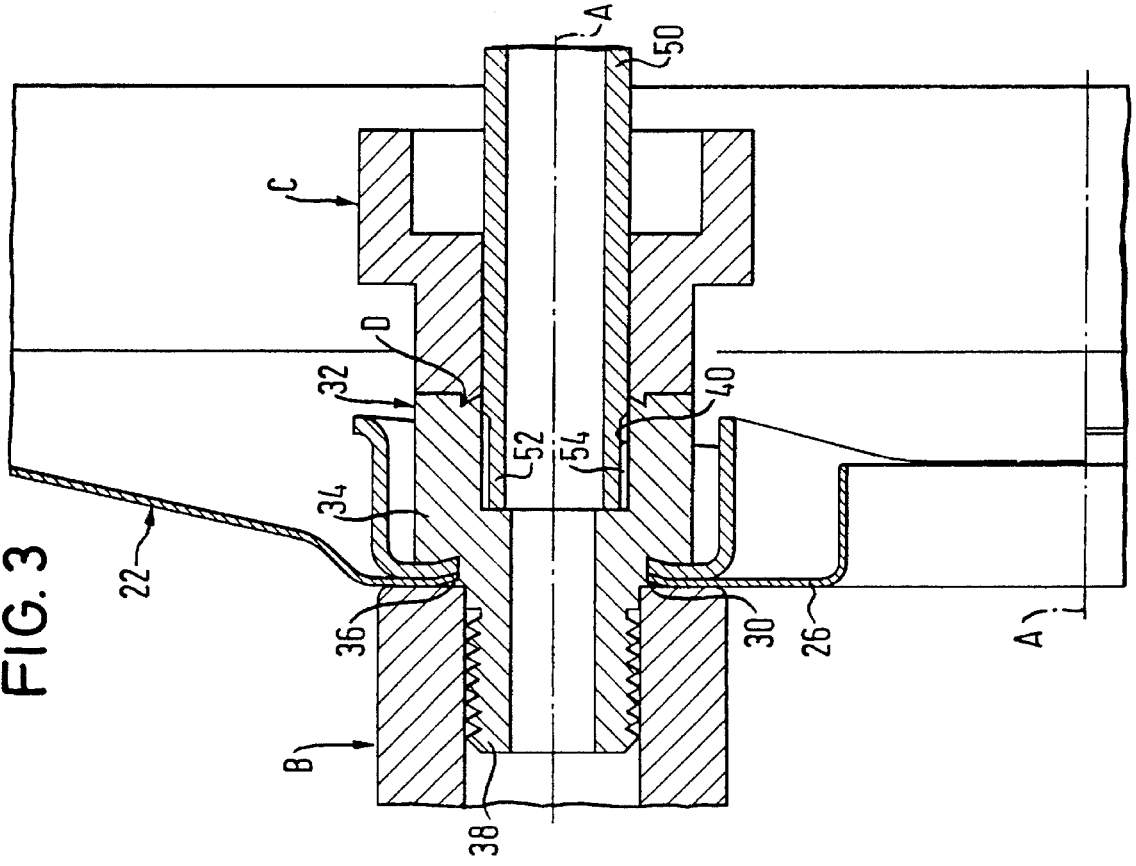
FIG. 2 shows a detail of FIG. 1 before crimping.

A tubular spacer 50 is assigned to each pair of aligned connecting members 32 and 42, which with a front end portion 52 of tubular spacer 50 engages the enlarged cylindrical recess 40 of the assigned front connecting member 32. According to FIGS. 2 and 3, the front section 52 of each spacer 50 comprises a knurled portion 54. FIGS. 4 and 5, however show that an annular groove 56 is cut at the transition between the front end portion 52 and the main part of each spacer 50 rearward of the end portion 52. Each one of the two spacers 50 has a rear end portion 58, according to FIG. 1, which may be adjustably screwed into the associated rear connection member 42, in a conventional manner.

FIG. 1 shows that a bead-like outer marginal region of a movable partition 60 is firmly and tightly clamped between outer marginal regions of the two housing parts 22 and 24. A flange 62 of the master brake cylinder 18 is held in abutment at the front housing bottom 26. Flange 62 comprises a pair of holes 64 which receive the pin with thread 38 of one, each, of the two front connecting members 32. A nut 66 is screwed on each of the pins with thread 38 and engages the associated hole 64 of flange 62 with an outwardly smooth cylindrical lug 68 that is formed on the nut.

For tightly assembling or joining the front connecting members 32 with front housing bottom 26, on the one hand, and with the associated spacer 50, on the other hand, the latter is inserted with its front end portion 52 into recess 40 of the associated front connecting member 32, and the collar 36 thereof is passed through the associated fastening hole 30 of the front housing bottom 26 and received by an annular tool member B. Spacer 50 extends through a likewise annular tool member C. Each of the front connecting members 32 is firmly and tightly crimped at the same time with the front housing bottom 26 and with the associated spacer 50 by firmly, e.g. hydraulically, compressing the two tool members B and C. This applies to both methods of operation illustrated in FIGS. 2 and 3, on the one hand, and in FIGS. 4 and 5, on the other.

Figure 3:
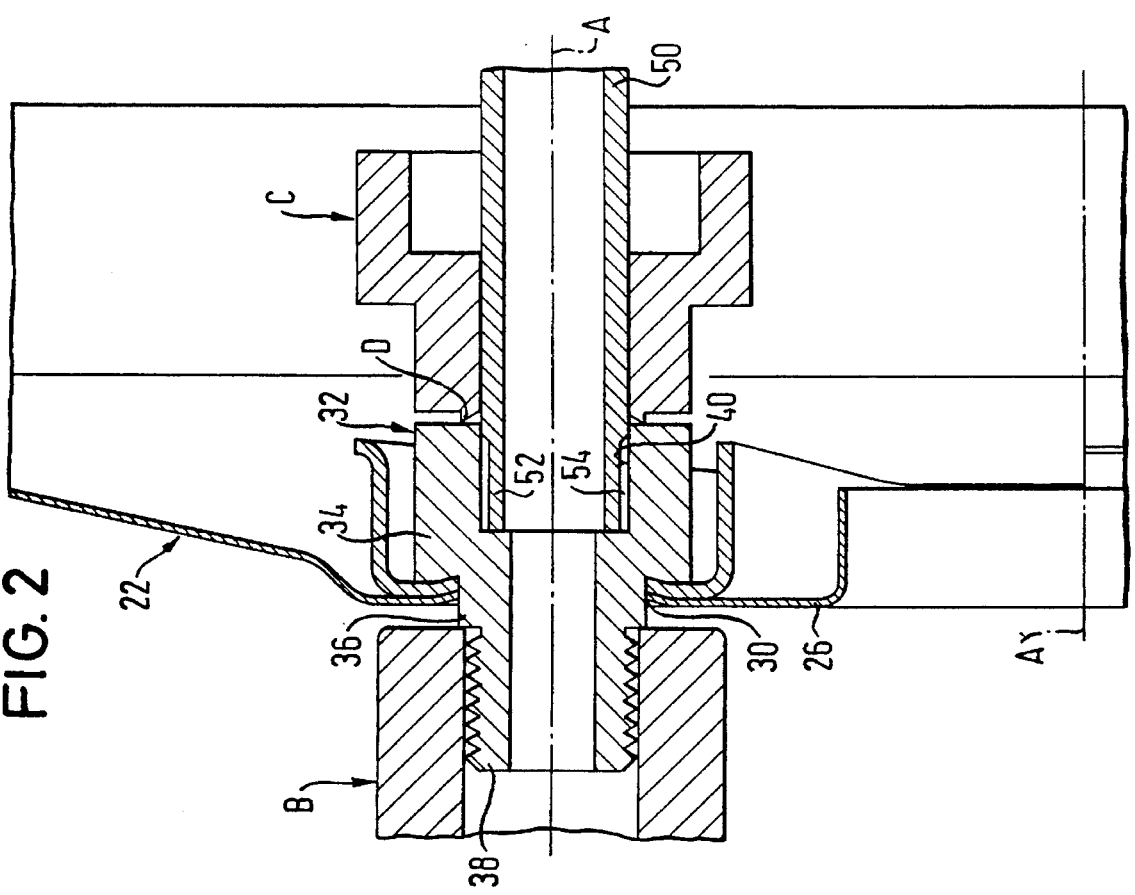
FIG. 3 shows a corresponding detail after crimping.

According to FIGS. 1 and 3, flange 34 of each of the two front connecting members 32 is compressed by the forces directed towards each other and exerted by tool members B and C, in such a way that part of the material forming the flange penetrates the knurled portion 54 at the front end portion 52 of the associated spacer 50. For enhancement, tool member C according to FIGS. 2 and 3 has a sharp-edged annular projection D which is outwardly defined by a cylindrical face and inwardly by a face of a hollow cone.

According to FIGS. 4 and 5, an annular projection 70 is formed at the face end of the flange 34 of each one of the front connecting members 32, said face end being the inner one with respect to booster housing 20, wherein said annular projection 70 is pressed into the annular groove 56 by tool member C. To this end, tool member C is provided with a face E of a hollow cone that extends across annular projection 70.

We claim:

1. A booster housing, especially for vehicle brake systems, comprising:

two housing bottoms which are disposed at either side of a movable partition and are provided with fastening holes, connecting members which are mounted on at least one of the housing bottoms and are tightly crimped with the respective housing bottom around the fastening holes thereof, and spacers which extend between the two housing bottoms as well as through the movable partition and are fixed to the connecting members, wherein each of the connecting members has a recess into which an end portion of the associated spacer is inserted, and the connecting member crimped.

2. The booster housing as defined in claim 1 wherein the end portion of the spacer comprises a knurled portion.

3. The booster housing as defined in claim 1 or claim 2, wherein the end portion of the spacer is provided with an annular groove and wherein an annular projection is formed on the associated connecting member and is pressed into the annular groove at least partly when the connecting member is crimped.

4. A method of assembling a booster housing, for vehicle brake systems, said booster housing having two housing bottoms disposed at either side of a movable partition and provided with fastening holes, comprising the steps of:

inserting an end portion of a spacer into a recess of a connecting member, passing the connecting member through one of the fastening holes in the housing bottoms in such a way that a collar formed on the connecting member extends through the fastening hole, and simultaneous crimping the connecting member with the housing bottom and the spacer.

5. The method as defined in claim 4 wherein the front side of a flange formed on the connecting member is crimped with the housing bottom, and the rear side of that same flange is crimped with the spacer.

\* \* \* \* \*